United States Patent [19]
Lange et al.

[11] Patent Number: 5,179,508
[45] Date of Patent: Jan. 12, 1993

[54] STANDBY BOOST CONVERTER

[75] Inventors: Gerhard G. Lange, Apalachin; Michael M. Walters, Endwell, both of N.Y.

[73] Assignee: International Business Machines Corp., Armonk, N.Y.

[21] Appl. No.: 777,839

[22] Filed: Oct. 15, 1991

[51] Int. Cl.$^5$ .............................. H02M 3/335
[52] U.S. Cl. ...................... 363/16; 323/222; 323/299; 361/111
[58] Field of Search ..................... 363/16–26, 363/70; 323/299, 222; 361/90, 91, 111

[56] References Cited

U.S. PATENT DOCUMENTS

| | | | |
|---|---|---|---|
| 4,160,288 | 7/1979 | Stuart et al. | 363/41 |
| 4,533,986 | 8/1985 | Jones | 323/222 X |
| 4,743,835 | 5/1988 | Bossé et al. | 323/222 X |
| 4,942,509 | 7/1990 | Shires et al. | 323/222 X |
| 4,950,974 | 8/1990 | Pagano | 323/222 |
| 5,060,130 | 10/1991 | Steigerwald | 363/65 |

Primary Examiner—Emanuel T. Voeltz
Attorney, Agent, or Firm—William H. Steinberg

[57] ABSTRACT

A boost voltage converter is combined with any DC-DC converter to provide a power system with significant overall power efficiency improvement in applications requiring continuous operation through low line transient levels. The boost converter is normally in a standby mode and only operates when the input DC voltage drops below a predetermined minimum steady state voltage. During steady state operation, a simple, efficient feedthrough of the DC current directly to the DC-DC converter is provided. Efficiency improvements in the combination of boost converter and DC-DC converter result from the reduction of the effective transient range seen by the DC-DC converter, allowing the DC-DC converter components to be designed and selected to significantly reduce their power dissipation during nontransient input steady-state operation.

14 Claims, 1 Drawing Sheet

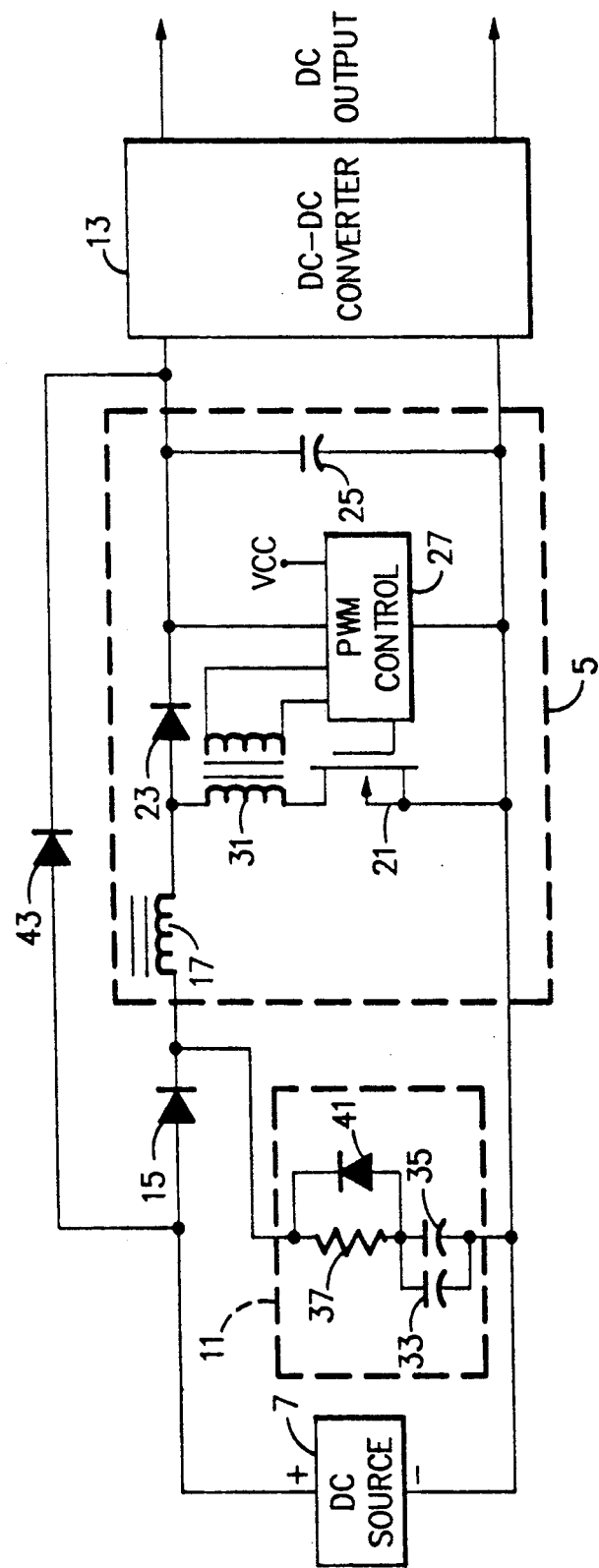

:

STANDBY BOOST CONVERTER

BACKGROUND OF THE INVENTION

The present invention relates to DC-DC switchmode power converters.

Switchmode DC-DC power converters have the advantages of high power conversion efficiencies and small size. Very frequently the converters are used in applications which require well regulated, uninterrupted output voltages despite the fact that the input voltages may be subjected to severe transients. If the transient excursions from the steady state input levels have large amplitudes and/or long durations, the circuit design of the DC-DC converter and the selection of components result in a design that has less than optimal efficiency when the converter is operated at steady state conditions. Additional requirements for local energy storage resulting from the interruption of input power can impose more severe input voltage requirements, below the power source minimum voltage transient level and thus further aggravate the problem of creating an efficient design. In addition to reduced efficiency when operated at steady state conditions, the converters designed to accommodate a large input voltage range with energy storage requirements are usually physically larger.

Applications which impose a wide variation of input voltage on the electrical power system are usually those in which there is a power limited source, such as; a solar array, aircraft electrical generator or battery source. High efficiency operation is particularly important when the input source is power limited.

It is an object of the present invention to provide a power system that can provide well regulated output voltages from an input source with wide transient variations and achieve a significant overall power efficiency improvement.

It is a further object of the present invention to provide a power system with well regulated output voltages from a wide range of input voltage with a significant size reduction. Applications having a need for greater local energy storage will provide the opportunity for the largest size reduction.

SUMMARY OF THE INVENTION

In one aspect of the present invention a power system connected to a power source includes a boost converter connected to a second power converter. The boost converter is connected to the power source and provides a higher output voltage than input voltage, responsive to the boost input voltage being below a predetermined value. The predetermined value is below the minimum steady state input voltage. A second power converter has its input coupled to both the boost converter output and to the power source, so that the converter receives power at a predetermined minimum voltage and the boost converter is bypassed when the power source is above the predetermined voltage.

In another aspect of the present invention the boost converter of the power system comprises an inductor in series with a controllable switch. The inductor and controllable switch are connected in parallel with the power source. A rectifier is connected to the junction of the inductor and the controllable switch. A filter capacitor is connected at one end to the rectifier, with the rectifier poled to transfer power from the power source to the power converter. A boost converter control means is coupled to the controllable switch and is responsive to the input voltage of the second power converter for modulating the controllable switch when the boost input voltage is below a predetermined value.

BRIEF DESCRIPTION OF THE DRAWING

The Figure is a schematic diagram representation of a Power System with a boost converter connected to a DC-DC converter in accordance with the present invention.

DETAILED DESCRIPTION OF THE INVENTION

Referring now to the Figure, a standby boost converter 5 is shown connected to a power source 7, which in the preferred embodiment is a DC source, and to an energy storage means comprising a charge controlled capacitor bank 11. A DC input power converter 13 is connected to the output of the standby boost converter 5 and to an optional bypass diode 43. The standby boost converter 5 receives power through a diode 15. The standby boost converter comprises an inductor 17, and controllable switch, shown as an n-channel power MOSFET 21 connected in series with diode 15. The series combination of the diode 15, inductor 17, and MOSFET 21 are connected across the DC power source 7, with the anode of diode 15 connected to the positive terminal of the DC source and the source of the MOSFET connected to the negative terminal of the DC source. The anode of a diode 23 is connected to the junction of inductor 17 and MOSFET 21. The cathode of diode 23 is connected to one end of an output filter capacitor 25. The other end of the filter capacitor is connected to the negative terminal of the DC power source. A boost controller, shown as a pulse width modulator (pwm) controller 27, is connected across filter capacitor 25 and to the gate of MOSFET 21. The pwm controller 27 can either be current or voltage controlled with a current controlled pwm controller shown. When a current controlled pwm controller such as a UC 1842 or UC 1823 available from Unitrode is used, a current sensor, shown as a current transformer 31 is used to sense the drain current in the MOSFET. Power for the pwm controller (VCC) can be obtained from an output of the DC-DC converter, for example.

The charge controlled capacitor bank 11 comprises parallel connected capacitors 33 and 35 in series with the parallel combination of a resistor 37 and a diode 41. The power converter 13 with DC input from standby boost converter 5 can be a DC-AC converter or a DC-DC converter, as shown. The DC-DC converter 13 can be of any type, such as boost, buck, or buck-boost. A bypass diode 43 connects one input terminal of the DC-DC converter 13 to the positive terminal of the DC source. The other input terminal of the DC-DC converter is connected to the negative terminal of the DC source.

In operation, when the DC power source 7 is above a predetermined voltage, the boost converter 5 does not operate. When the boost converter is not operating, power flows through diode 15, inductor 17, and diode 23 to DC-DC converter 13. Inductor 17 and capacitor 25 provide for additional filtering. Optionally, efficient feedthrough from the DC power source 7 takes place through the bypass diode 43 to the DC-DC converter 13. The optional bypass diode 43 is more efficient because, its voltage drop is less than the voltage drop across diodes 15 and 23 and inductor 17. When a DC-DC converter has energy storage requirements a diode is normally used to prevent current from flowing back to the DC source. Therefore, the bypass diode 43 does not introduce a penalty in operating efficiency during the steady state operating mode. During steady state operation, the capacitors 33 and 35 are charged to the DC input voltage, less a diode drop. The current supplied to the capacitors 33 and 35 flows through resistor 37 which limits the current flow. Current flow limiting is important when the capacitor bank is being charged. When energy is withdrawn from the capacitors 33 and 35, the resistor 37 is bypassed by diode 41.

The standby boost converter 5 operates when the boost input voltage drops below the predetermined voltage. MOSFET 21 is pulse-width modulated (pwm) by controller 27 when the voltage at the input to the DC-DC converter 13 drops below a predetermined value. Inductor 17 stores energy when MOSFET 21 is modulated on and inductor 17 releases energy to filter capacitor 25 and DC-DC converter 13 when MOSFET 21 is modulated off. A snubber circuit (not shown) can be used to limit the current spike flowing through the MOSFET when it is turned on. The spike occurs when reverse current flows through diode 23 until it becomes reversed biased.

The power system efficiency benefits from having a standby boost converter in combination with the DC-DC converter result from the reduction of the effective transient range of voltage provided to the DC-DC converter. The DC-DC converter components can now be designed and selected to significantly reduce their power dissipation during steady operation. For example, the reverse voltage rating of the output diodes in the DC-DC converter 13 can be reduced to yield lower forward voltage drop thus lowering the power dissipation. In addition, the standby boost converter can allow the power system to operate to an arbitrarily low transient input voltage (without effecting the steady state efficiency) resulting in the ability to significantly reduce the size of the normally bulky energy storage capacitors 33 and 35. The pwm controller 27 requires a bias power source for operation and a must be powered whether or not the boost converter is operating. The overall increase in efficiency, which can be 5-10% in a 200 watt supply more than makes up for this small control power requirement. The use of the standby boost converter and DC input power converter combination, will result in the greatest efficiency gains in applications having a wide range of input voltage, high power requirements, and large energy storage requirements resulting from the need to maintain operation during long input power interruptions.

An AC rectifier could be substituted for diode 15 to allow for applications which derive power from an AC source. In this case, bypass diode 43 would be deleted as it would no longer be applicable. The deletion of bypass diode 43 would allow inductor 17 and capacitor 25 to act as an effective filter. The filtering benefits of inductor 17 may prove advantageous for high DC voltage source applications where bypass diode 43 could be eliminated with relatively low power loss penalty.

The foregoing has described a converter that can provide well regulated output voltages from a wide range of DC input voltages with a significant overall power efficiency improvement.

While the invention has been particularly shown and described with reference to a preferred embodiment thereof, it will be understood by those skilled in the art that various changes in form and details may be made therein without departing from the spirit and scope of the invention.

What is claimed:

1. A power system connected to a power source comprising:
    a boost converter connected to the power source, said boost converter providing a higher output voltage than input voltage when the input voltage of the boost converter is below a predetermined voltage; and
    a second power converter having its input coupled to both said boost converter output and to the power source, so that said second power converter receives power at a predetermined minimum voltage and said boost converter is bypassed when the power source is above said predetermined voltage.

2. The circuit of claim 1 wherein said second power converter comprises a DC-DC switchmode power converter.

3. The circuit of claim 1, wherein said boost converter comprises, an inductor in series with a controllable switch, said inductor and controllable switch connected in parallel with, said power source, a rectifier connected to the junction of said inductor and said controllable switch, a filter capacitor, connected at one end to said rectifier, said rectifier poled to transfer power from said power source to said power converter, and boost converter control means coupled to said controllable switch and responsive to the input voltage of the second converter power for modulating said controllable switch when the input voltage of the boost converter power source is below a predetermined voltage.

4. The circuit of claim 3 wherein said second power converter comprises a DC-DC switchmode power converter.

5. The circuit of claim 1, further comprising an energy storage means and wherein said boost converter comprises a first rectifier connected in series with said energy storage means, said rectifier and energy storage means connected in parallel with said power source, an inductor in series with a controllable switch, said inductor and controllable switch in parallel with said energy storage means, a second rectifier connected to the junction of said inductor and said controllable switch, a filter capacitor, connected at one end to said second rectifier, said first and second rectifiers poled to transfer power from said power source to said energy storage means and from said inductor to said filter capacitor, respectively and boost converter control means coupled to said controllable switch and responsive to the input voltage of the second converter for modulating said controllable switch when the input voltage of the boost converter is below a predetermined voltage.

6. The circuit of claim 5, wherein said second power converter is connected through a third rectifier to the power source and connected across the filter capacitor of the boost converter.

7. The circuit of claim 6 wherein said second power converter comprises a DC-DC switchmode power converter.

8. The circuit of claim 6 wherein said boost control means comprises a current controlled pwm controller.

9. The circuit of claim 6 wherein said controllable switch comprises an MOSFET transistor.

10. The circuit of claim 6 wherein the power for operating said boost converter control means is obtained from the output of said power converter.

11. A circuit connected to a DC power source comprising:
   energy storage means;
   a boost converter having a first rectifier connected in series with said energy storage means, said rectifier and energy storage means connected in parallel with said DC power source, an inductor in series with a controllable switch,
   said inductor and controllable switch in parallel with said energy storage means, a second rectifier connected to the junction of said inductor an said controllable switch, an output filter capacitor connected at one end to said second rectifier and at the other end to one side of the DC power source, said first and second rectifiers poled to transfer power from said DC power source to said energy storage means and from said inductor to said capacitor, respectively, and control means for modulating said controllable switch; and
   a second power converter having its input coupled to the output of said boost converter and connected through a third rectifier to the DC power source, said control means responsive to the input voltage of the second power converter for modulating said controllable switch when the input voltage of the boost converter is below a predetermined value, so that said second power converter receives power at a predetermined minimum voltage.

12. The circuit of claim 11 wherein said second power converter comprises a DC-DC switchmode power converter.

13. The circuit of claim 11 wherein said boost control means comprises a current controlled pwm controller.

14. The circuit of claim 11 wherein the power for operating said boost converter control means is obtained from the output of said second power converter.

* * * * *